United States Patent
Li

(10) Patent No.: US 12,190,101 B2
(45) Date of Patent: Jan. 7, 2025

(54) OPERATING METHOD OF MOUSE CHIP

(71) Applicant: PixArt Imaging Inc., Hsin-Chu County (TW)

(72) Inventor: Jr-Yi Li, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 245 days.

(21) Appl. No.: 17/738,324

(22) Filed: May 6, 2022

(65) Prior Publication Data

US 2022/0261235 A1 Aug. 18, 2022

Related U.S. Application Data

(63) Continuation-in-part of application No. 17/136,480, filed on Dec. 29, 2020, now Pat. No. 11,681,514.

(51) Int. Cl.
*G06F 8/654* (2018.01)
*G06F 3/06* (2006.01)
*G06F 13/10* (2006.01)

(52) U.S. Cl.
CPC ............ *G06F 8/654* (2018.02); *G06F 3/0604* (2013.01); *G06F 3/0655* (2013.01); *G06F 3/0679* (2013.01); *G06F 13/102* (2013.01)

(58) Field of Classification Search
CPC ....................................................... G06F 8/65
See application file for complete search history.

(56) References Cited

U.S. PATENT DOCUMENTS

| | | |
|---|---|---|
| 9,940,123 B1 | 4/2018 | Ayoub et al. |
| 10,754,988 B2 | 8/2020 | Tasher et al. |
| 2004/0243992 A1 * | 12/2004 | Gustafson ................. G06F 8/65 717/168 |
| 2005/0144613 A1 | 6/2005 | Tseng |
| 2006/0107032 A1 | 5/2006 | Paaske et al. |
| 2017/0123780 A1 | 5/2017 | Albot et al. |
| 2021/0312057 A1 * | 10/2021 | Kloth ..................... G06F 3/0623 |

* cited by examiner

*Primary Examiner* — Duy Khuong T Nguyen
(74) *Attorney, Agent, or Firm* — HAUPTMAN HAM, LLP

(57) ABSTRACT

There is provided a mouse chip including a flash chip, a flash controller and a random access memory. The flash chip is embedded with a firmware, which is recorded with a flash driver and user configurations. Each time the mouse chip is powered on, the flash controller reads the flash driver and the user configurations from the firmware to the random access memory for being updated if necessary.

10 Claims, 7 Drawing Sheets

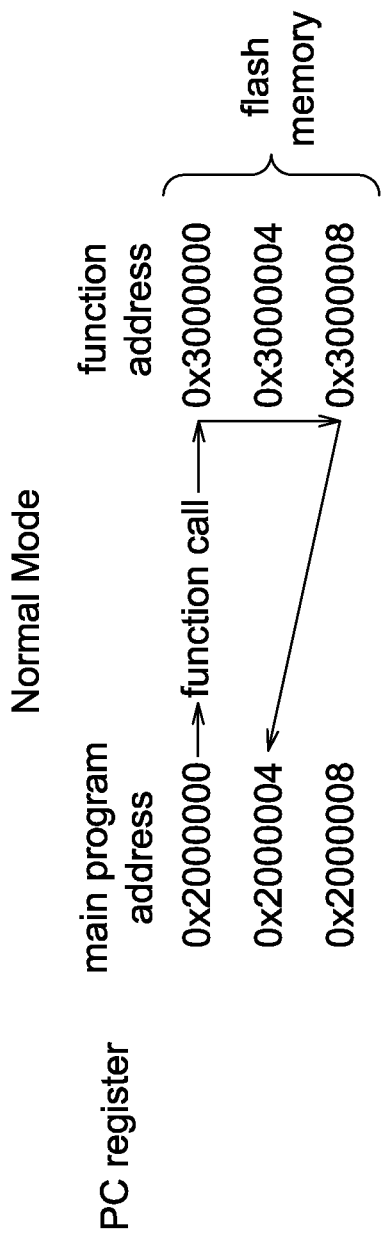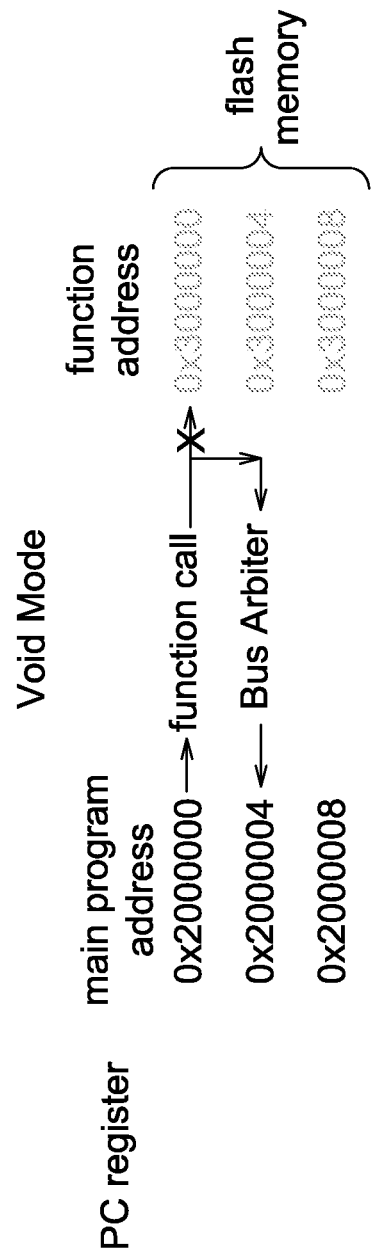

OPERATING METHOD OF MOUSE CHIP

CROSS REFERENCE TO RELATED APPLICATION

The present application is a continuation-in-part application of U.S. patent application Ser. No. 17/136,480 filed on, Dec. 29, 2020, the disclosure of which is hereby incorporated by reference herein in its entirety.

BACKGROUND

1. Field of the Disclosure

This disclosure generally relates to a mouse device and, more particularly, to a mouse chip that needs not to stop the operation of all firmware in updating the firmware and an operating method thereof.

2. Description of the Related Art

It is known that the flash is operated by serial access. Because a microcontroller unit is operated by randomly accessing a memory in running a function call, the flash is not suitable to be used as the memory for the microcontroller unit to run the called function. If a cache can be used to read the flash, it is possible to realize the purpose of randomly accessing a flash.

The firmware embedded in an ASIC of a navigation device is mainly divided into two parts. One part of firmware is embedded in the ROM to execute navigation function of the navigation device, and the other part of firmware is recorded in the flash as a driver of functions other than the navigation function.

However, when the navigation device is being operated by a user, the operation of all firmware should be ceased if it is desired to update the firmware recorded in the flash, e.g., entering a so called programming mode, and the system needs to be rebooted after the update so as to finish the whole update procedure.

Accordingly, it is necessary to provide a mouse device that continuously performs the navigation function when the firmware in the flash is being updated and an operating method thereof.

SUMMARY

The present disclosure provides a control chip that adopts an additional hardware to directly reply a return value of a currently called function of the microcontroller unit (MCU) without reading a function return value of the called function from a flash when the firmware in the flash is being updated, and an operating method of the control chip.

The present disclosure further provides a control chip and an operating method thereof that read the function return value from a first bus and update the firmware in the flash via a second bus.

The present disclosure provides an operating method of a mouse chip, which includes a flash chip, a flash controller, a random access memory (RAM) and a cache controller. The operating method includes the steps of: controlling, by the cache controller, the flash controller to read a flash driver from a firmware in the flash chip to the RAM using a single mode of serial flash; identifying, by the read flash driver, a chip ID of the flash chip to confirm whether the flash chip is supported by the flash driver; accessing, by the flash controller, the flash chip using a high speed mode of serial flash upon the flash chip being supported by the flash driver; and updating the flash driver in the firmware upon the flash chip being not supported by the flash driver.

The present disclosure further provides an operating method of a mouse chip, which includes a flash chip, a flash controller and a random access memory (RAM). The operating method includes the steps of: expanding a predetermined algorithm embedded in a firmware in the flash chip into the RAM; calculating, by the expanded predetermined algorithm, a number of available cluster spaces in at least one flash sector; and erasing the at least one flash sector upon the number of available cluster spaces being smaller than an erase threshold.

BRIEF DESCRIPTION OF THE DRAWINGS

Other objects, advantages, and novel features of the present disclosure will become more apparent from the following detailed description when taken in conjunction with the accompanying drawings.

FIG. 2 is an operational schematic diagram of a mouse device operating in a normal mode according to one embodiment of the present disclosure.

FIG. 3 is an operational schematic diagram of a mouse device operating in a void mode according to one embodiment of the present disclosure.

DETAILED DESCRIPTION OF THE EMBODIMENT

It should be noted that, wherever possible, the same reference numbers will be used throughout the drawings to refer to the same or like parts.

The mouse device of the present disclosure communicates with an external host 90 via a USB interface or a Bluetooth interface. The USB interface provides power of the mouse device during operation, and transmits mouse movement data, control signals of mouse key click and mouse roller rotation as well as update data, which is used to update firmware recorded in a flash of the mouse device. The Bluetooth interface transmits mouse movement data, control signals of mouse key click and mouse roller rotation as well as update data. In order to realize randomly accessing the flash when the microcontroller unit (MCU) is executing a function call, the mouse device of the present disclosure adopts a structure of caching a flash by a cache controller.

Figure 1:
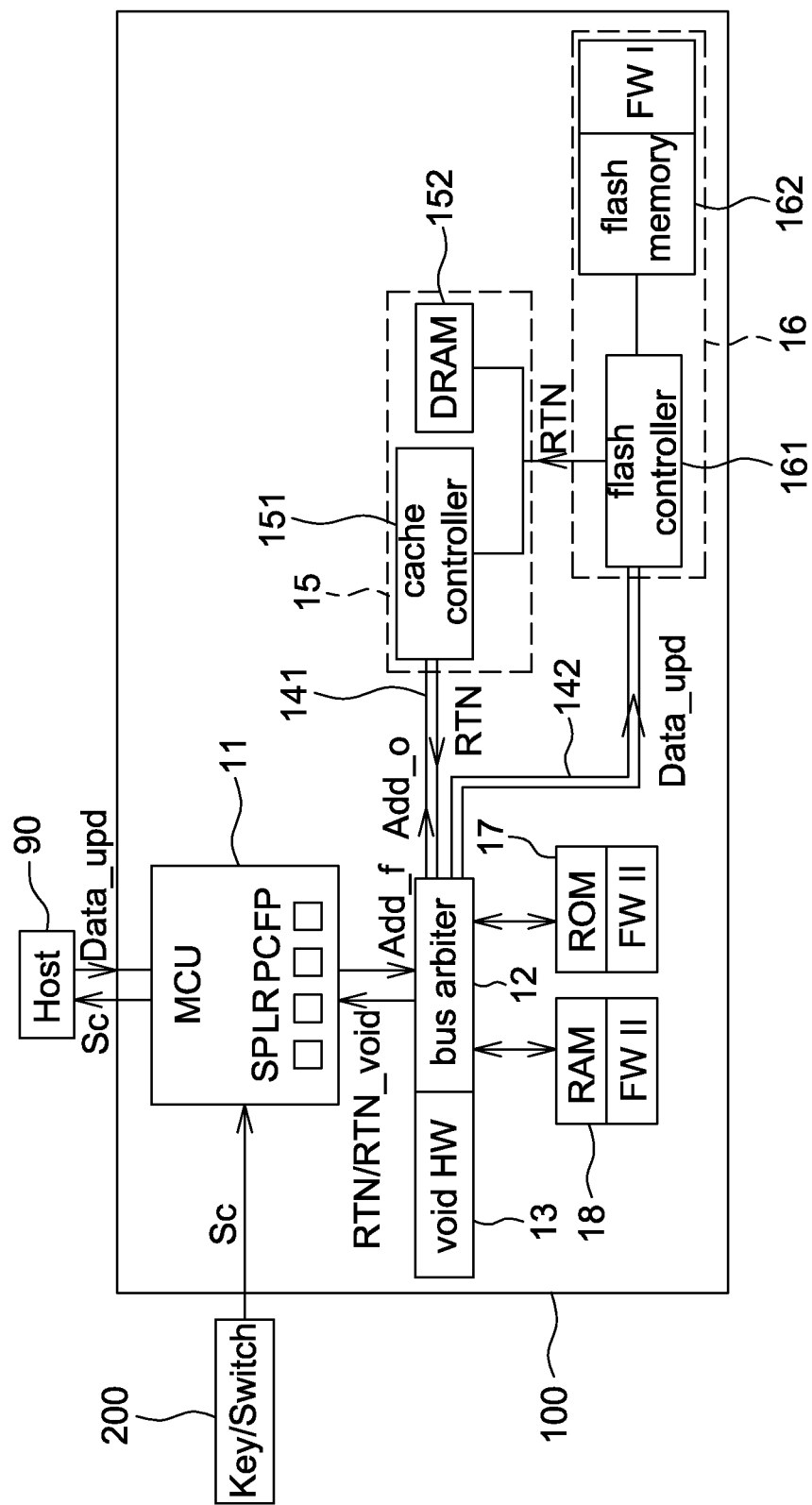
FIG. 1 is a schematic block diagram of a mouse device according to one embodiment of the present disclosure.

Please referring to FIG. 1, it is a schematic block diagram of a mouse device according to one embodiment of the present disclosure. The mouse device includes a mouse chip 100 and a key/switch 200, wherein the mouse chip 100 is arranged inside a mouse case and connected to an external host 90 via a USB interface or a Bluetooth interface. The operation of the USB interface and the Bluetooth interface is known to the art. The key/switch 200 is arranged on the mouse case to generate a control signal Sc to the mouse chip 100, e.g., generating a click signal or a switching signal as an update instruction.

In one aspect, the key/switch 200 is an exclusive element that is used to generate an update instruction (e.g., included in the control signal Sc shown in FIG. 1). After the mouse chip 100 receives the update instruction from the key/switch 200, the update instruction is sent to the host 90 to cause the host 90 to start to transmit update data Data_upd to the mouse chip 100. In another aspect, the update instruction is generated by the host 90 while executing predetermined software (APP). After sending the update instruction to the mouse chip 100, the host 90 then transmits update data Data_upd to the mouse chip 100 to update the firmware in a flash thereof. The update data Data_upd is, for example, download from internet or other storage devices.

The mouse chip 100 includes a microcontroller unit (or microcontroller) 11, a bus arbiter 12, a void hardware (shown as void HW) 13, a first bus 141, a second bus 142, a cache 15 and a flash 16, wherein the void hardware 13 is an additional hardware which is included in the bus arbiter 12 or is an independent hardware outside the bus arbiter 12. The void hardware 13 operates in a void mode, which is described by an example below. The cache 15 includes a cache controller 151 and a cache memory 152 (e.g., shown as DRAM, but not limited thereto). The flash 16 includes a flash controller 161 and a flash memory 162.

The flash memory 162 is recorded with first firmware (shown as FW I), which is used to control functions other than the navigation function, e.g., using as a driver of a third party's integrated circuit. In one aspect, if the mouse device of the present disclosure is a gaming mouse, the first firmware is used to control the lighting and/or flickering of multiple light emitting diodes (not for navigation function). For example, the first firmware is not embedded in the mouse device before shipment, but is installed or recorded as program codes in the flash 16 via an interface between the mouse device and the host 90 after shipment, but the present disclosure is not limited thereto.

The mouse device of the present disclosure further includes at least one of a read only memory (ROM) 17 and a random access memory (RAM) 18 connected to the bus arbiter 12, and the ROM 17 or the RAM 18 is embedded with second firmware (shown as FW II). In one aspect, the second firmware is used to calculate a mouse movement, and identify a mouse key click as well as a mouse roller rotation. For example, the second firmware is embedded in the application specific integrated circuit (ASIC) of the mouse device before shipment as one of basic control codes of the mouse device.

In the present disclosure, the mouse chip 100 is described by adopting an Advanced Microcontroller Bus Architecture (AMBA) system, but the present disclosure is not limited thereto.

The MCU 11 is connected with the host 90 in a wired or wireless manner, and is used to transmit the control signal Sc to the host 90 and receive the update data Data_upd therefrom, wherein the update data Data_upd is used to update the first firmware in the flash memory 162. The control signal Sc includes, for example, a mouse movement data, signals of mouse key click and mouse roller rotation, as well as an update instruction (e.g., generated by the predetermined key/switch 200). During a function call, the MCU 11 generates a function address ADD_f of the function call, wherein the function address ADD_f has, for example, 32 bits.

The MCU 11 also accesses the ROM 17 and the RAM 18 and other peripherals using 32-bits addresses that are known to the art and not a main objective of the present disclosure, and thus details thereof are not described herein.

The MCU 11 further includes multiple registers, e.g., stack pointer (SP) register, link register (LR), program counter (PC) register and frame point (FP) register, wherein the LR is used to record, for example, a function return address of a function called by the MCU 11, and the PC register is used to record, for example, the function address ADD_f of the called function.

The mouse device of the present disclosure operates in a normal mode or a void mode depending on whether the MCU 11 receives an update instruction or not, from the key/switch 20 or the host 90.

The normal mode is a mode in which the MCU 11 normally reads a function return value RTN of a function called by the MCU 11 from the flash 16. In other words, content of the flash memory 162 is used to operate the function called by the MCU 11 to generate the function return value RTN, wherein the content herein is the program code of the first firmware or the program code instead of the first firmware.

The void mode is a mode in which the MCU 11 updates the first firmware in the flash memory 162 but does not read the function return value RTN from the flash 16. The void mode is entered after the MCU 11 receives the update instruction.

The bus arbiter 12 is connected with the MCU 11. In the normal mode, the bus arbiter 12 performs address mapping on the function address ADD_f to generate an operation address ADD_o, which is used to read the function return value RTN from the cache controller 151 via the first bus 141, wherein the operation address ADD_o is, for example, a content address (or sub-program address) in the flash memory 162 for executing the function called by the MCU 11.

The cache controller 151 is connected with the first bus 141. In the normal mode, the cache controller 151 caches, according to the operation address ADD_o, the function return value RTN generated in the flash memory 162 via the flash controller 161 into the cache memory 152 for being read by the bus arbiter 12. The bus arbiter 12 then replies the read function return value RTN to the MCU 11.

The flash controller 161 is connected with the cache controller 151 and the second bus 142, and used to read and write the flash memory 162. For example, the flash controller 161 holds the mapping between cache addresses (e.g., operation address ADD_o) and flash addresses such that when receiving the operation address ADD_o, the cache controller 151 caches the flash memory 162 based on the mapping, but the present disclosure is not limited thereto. It is possible that the flash controller 161 responds to the cache controller 151 by other ways to realize the random access on the flash 16 by the cache controller 151. In the normal mode, the cache controller 161 caches the function return value RTN generated by the content (or program) at a flash address in the flash memory 162 corresponding to the operation address ADD_o.

More specifically, when not receiving an update instruction, the MCU 11 operates in a normal mode, and the bus arbiter 12 reads the function return value RTN in the cache memory 162 via the first bus 161 for being replied to a function called by the MCU 11.

After receiving the update instruction, the MCU 11 enters a void mode (or called update mode). In the void mode, the bus arbiter 12 receives update data Data_upd from the MCU 11 and sends the update data Data_upd to the flash controller 161 via the second bus 142 (without passing the first bus 141) so as to update the first firmware in the flash memory 162 via the flash controller 161.

That is, in the normal mode, the bus arbiter 12 uses the first bus 141 to read the flash 16; whereas, in the void mode, the bus arbiter 12 uses the second bus 162 to write the flash 16.

For example referring to FIG. 2, in the normal mode, when a main program runs to an address 0x2000000 (e.g., recorded in PC register), a function is called. The function address of the called function is, for example, in the flash memory 162 such as 0x3000000 (e.g., an address of the program code in the flash memory 162 executing the function). After the function operation is accomplished (e.g., at an address 0x3000008) to obtain a function return value RTN, the PC register is directed to a next program address, e.g., shown as 0x2000004, which is recorded in LR register. The cache controller 151 returns the function return value RTN via the first bus 141 to the MCU 11.

Please referring to FIG. 3, in the void mode, the bus arbiter 12 is to update the first firmware in the flash memory 162 via the second bus 142. Similarly, when the main program runs to the address 0x2000000 (e.g., recorded in PC register), a function is called. In this scenario, the bus arbiter 12 does not receive the function return value RTN via the first bus 141. However, as the MCU 11 still needs to receive a return value of the called function to cause the main program to continuously operate, the void hardware 13 generates and replies a void return value RTN_void conforming to a format of the function return value RTN of the function called by the MCU 11 to replace the function return value RTN. Although the void return value RTN_void leads to a wrong result of the main program run by the MCU 11, this wrong result does not influence the navigation function of the mouse device. Meanwhile, the void hardware 13 directly changes the function address in the PC register to a next program address (e.g., shown as 0x4000000), i.e. the function return address in the LR. In FIG. 3, the function addresses in the flash memory 162 is shown by a lighter color to indicate that they are not executed.

In the void mode, the bus arbiter 12 also changes values in the SP register, the LR, and the FP register to any proper value as long as those values do not direct the program operation to enter the flash memory 162.

More specifically, the mouse chip 100 of the present disclosure is further arranged with a void hardware 13 that automatically generates and replies a void return value RTN_void conforming to a format of a function return value RTN of the function called by the MCU 11 to replace the function return value RTN when the bus arbiter 12 is updating the first firmware in the flash memory 162 via the second bus 142 and the flash controller 161 to allow the main program to continuously run. Accordingly, in the void mode, only the first firmware in the flash memory 162 is ceased and updated, but the second firmware in the ROM 17 and/or the RAM 18 is continuously running That is, in updating the first firmware, the mouse device continuously calculates the mouse movement, and identifies the mouse key click as well as the mouse roller rotation.

It should be mentioned that FIGS. 2 and 3 show function addresses to describe the operation of each mode. Because the operation address and the function address are the mapping to each other and are directed to the same memory location, the operation address is not shown herein. In addition, the addresses shown in FIGS. 2 and 3 are only intended to illustrate but not to limit the present disclosure.

Figure 4:
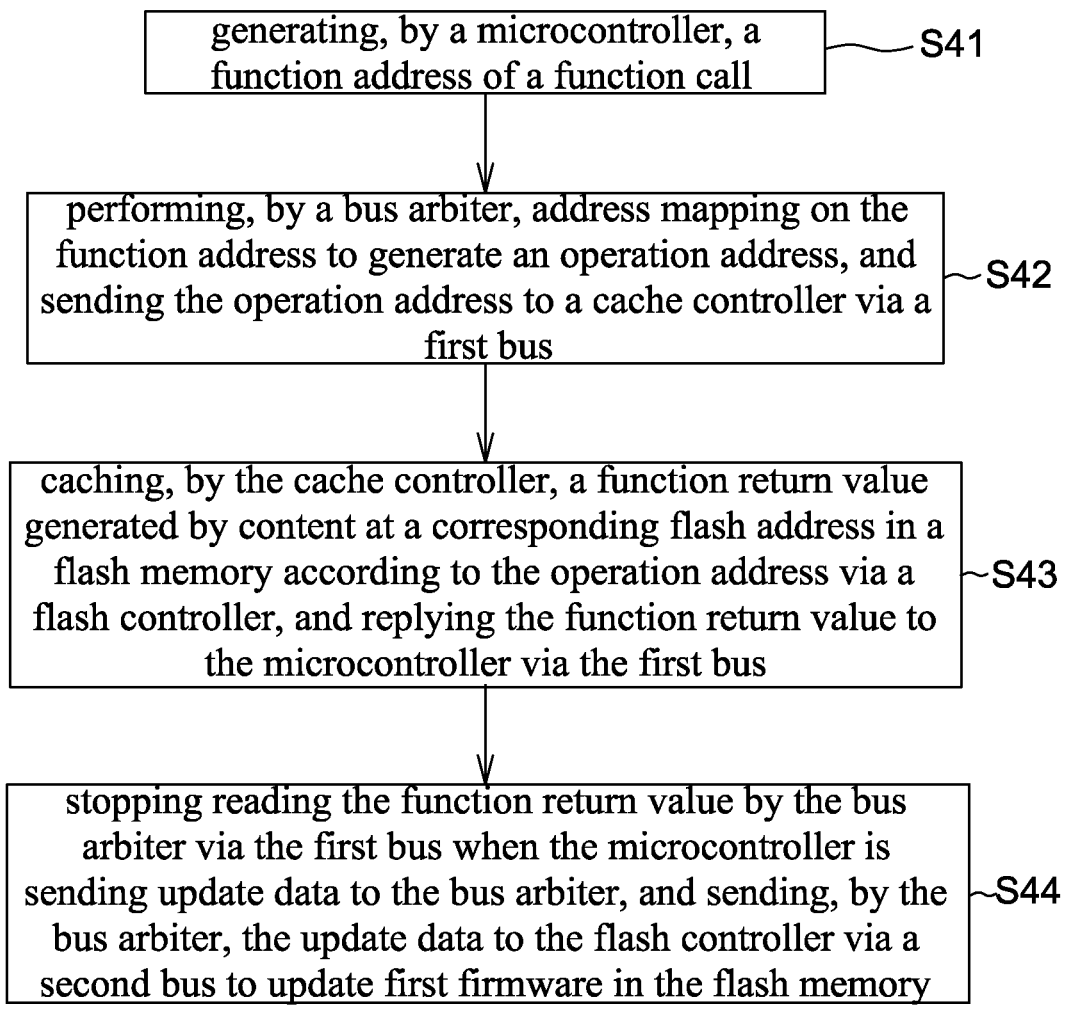
FIG. 4 is a flow chart of an operating method of a mouse device according to one embodiment of the present disclosure.

Please referring to FIG. 4, it is a flow chart of an operating method of a mouse device (or mouse chip) according to one embodiment of the present disclosure. The operating method is adapted to the mouse device in FIG. 1 and includes the steps of: generating, by a microcontroller 11, a function address ADD_f of a function call (Step S41); performing, by a bus arbiter 12, address mapping on the function address ADD_f to generate an operation address ADD_o, and sending the operation address ADD_o to a cache controller 151 via a first bus 141 (Step S42); caching, by the cache controller 151, a function return value RTN generated by content at a corresponding flash address in a flash memory 162 according to the operation address ADD_o via a flash controller 161, and replying the function return value RTN to the microcontroller 11 via the first bus 141 (Step S43); and stopping reading the function return value RTN by the bus arbiter 12 via the first bus 141 when the microcontroller 11 is sending update data Data_upd to the bus arbiter 12, and sending, by the bus arbiter 12, the update data Data_upd to the flash controller 161 via a second bus 142 to update first firmware in the flash memory 162 (Step S44).

Details of this operating method have been described above, and thus are not repeated herein. In the present disclosure, the bus arbiter 12 does not use the first bus 141 and the second arbiter 142 at the same time.

The flash cache structure of the present disclosure is not limited to be adapted to the mouse device but is also adaptable to the chip of other electronic devices that update the firmware in the flash during operation so as to improve the efficiency of updating the firmware.

Preferably, after updating the first firmware, the updated version of the first firmware continuously operates without rebooting the mouse device or the system. The updating process is started by pressing the key 200 or changing a position of the switch 200 on the mouse case.

Figure 5:
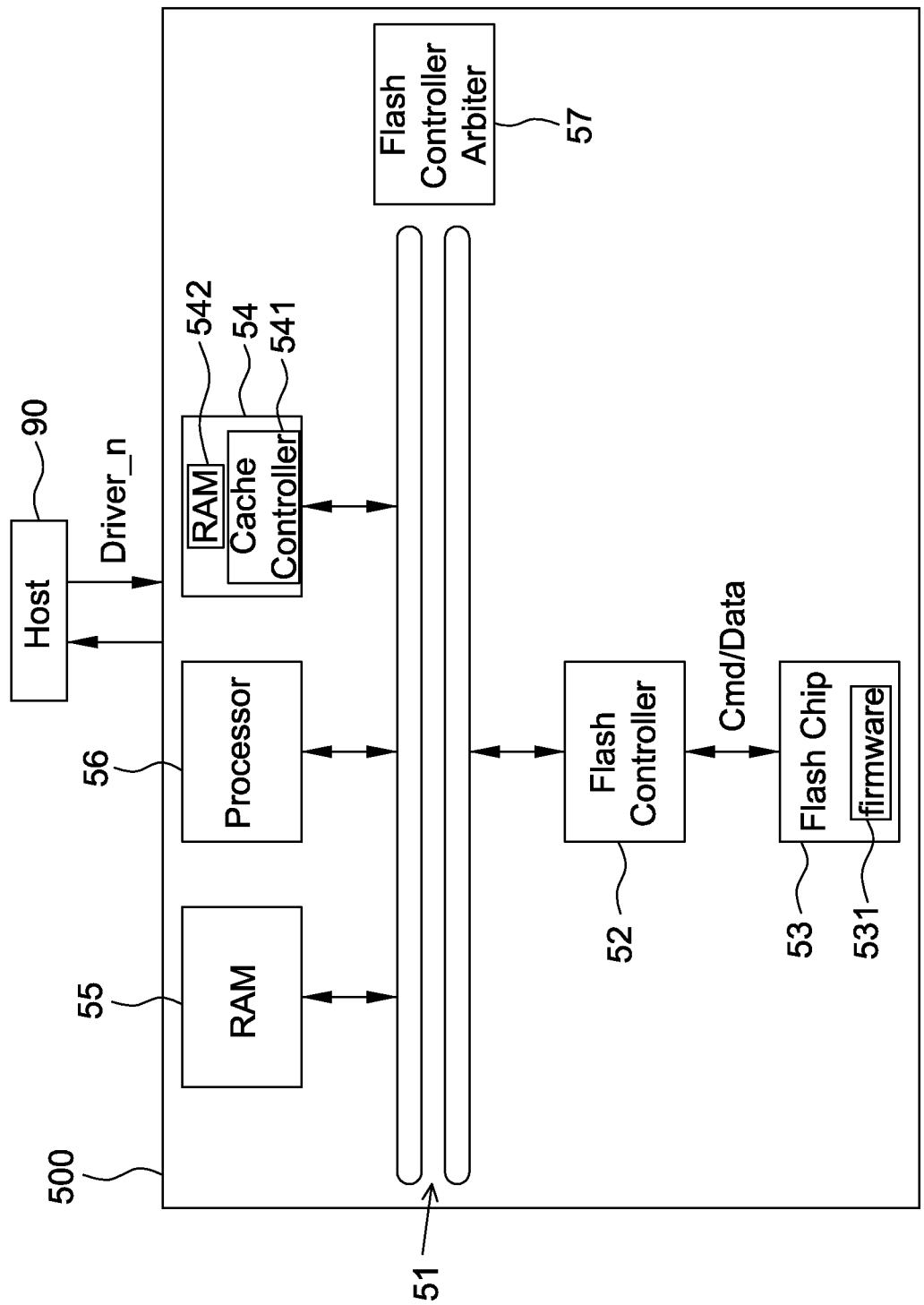
FIG. 5 is a schematic block diagram of a mouse chip, coupled to a host, according to a second embodiment of the present disclosure.

Please refer to FIG. 5, it is a schematic diagram of a mouse chip 500 according to a second embodiment of the present disclosure. The mouse chip 500 is coupled to a host 90, for example via a USB interface, and the host 90 is identical to the external host 90 mentioned above, and thus is not repeated again. Similarly, the mouse chip 500 is preferably arranged in a gaming mouse, but not limited to, and can be plugged to and unplugged from the host 90.

The mouse chip 500 includes a flash controller 52, a flash chip 53, a cache 54, a processor 56 (e.g., MCU 11 mentioned above), a RAM 55 and a flash controller arbiter (FCA, e.g., implemented by hardware) 57 coupled to a bus system 51 (e.g., AMBA bus, but not limited to). As mentioned above, the cache 54 includes a cache controller 541 and a cache memory (e.g., shown as RAM) 542. The FCA 57 controls the bus system 51 and coordinates every components coupled to the bus system 51. For example, the FCA 57 permits the flash operation, including erasing data, reading data, writing data and executing codes corresponding to different flash modes, which are known to the arts and thus not described herein. For example, when the flash chip 53 needs to change a current flash mode (e.g., read mode), the flash controller 52 acquires a control key from the FCA 57. The flash mode is changed (e.g., changing to write mode or erase mode) after getting a permission from the FCA 57. After the changed mode is accomplished, the flash controller 52 releases the control key back to the FCA 57 and the flash chip 53 returns to its original mode (e.g., read mode). The flash chip 53 operates in one mode at a time.

As mentioned above, the flash is not suitable to be used as a memory for the microcontroller unit to run the called function. The cache controller 541 firstly controls the flash controller 52 to load codes or algorithms from the firmware 531 in the flash chip (or called flash IC) 53 into the RAM 55 or the cache memory 542, and then the processor 56 executes the codes or algorithms expanded in the RAM 55 or the cache memory 542.

Generally, a flash driver for driving the flash chip 53 is embedded in the firmware 531. However, although the single mode of serial flash is compatible to flash chips made by different makers, the high speed mode of serial flash is not compatible between different flash chips if a suitable flash driver is not used. Accordingly, the flash driver originally embedded in the firmware 531 may not be able to support different flash chips. The present disclosure further provides a mouse chip 500 that checks whether a flash driver embedded in the firmware 531 supports full operations of a currently adopted flash chip 53 every time the mouse chip 500 is powered on. If a high speed mode of the flash chip 53 is not supported by a flash driver already embedded in the firmware 531, the flash driver is updated by a new flash driver that supports the high speed mode of data transmission.

Figure 6:
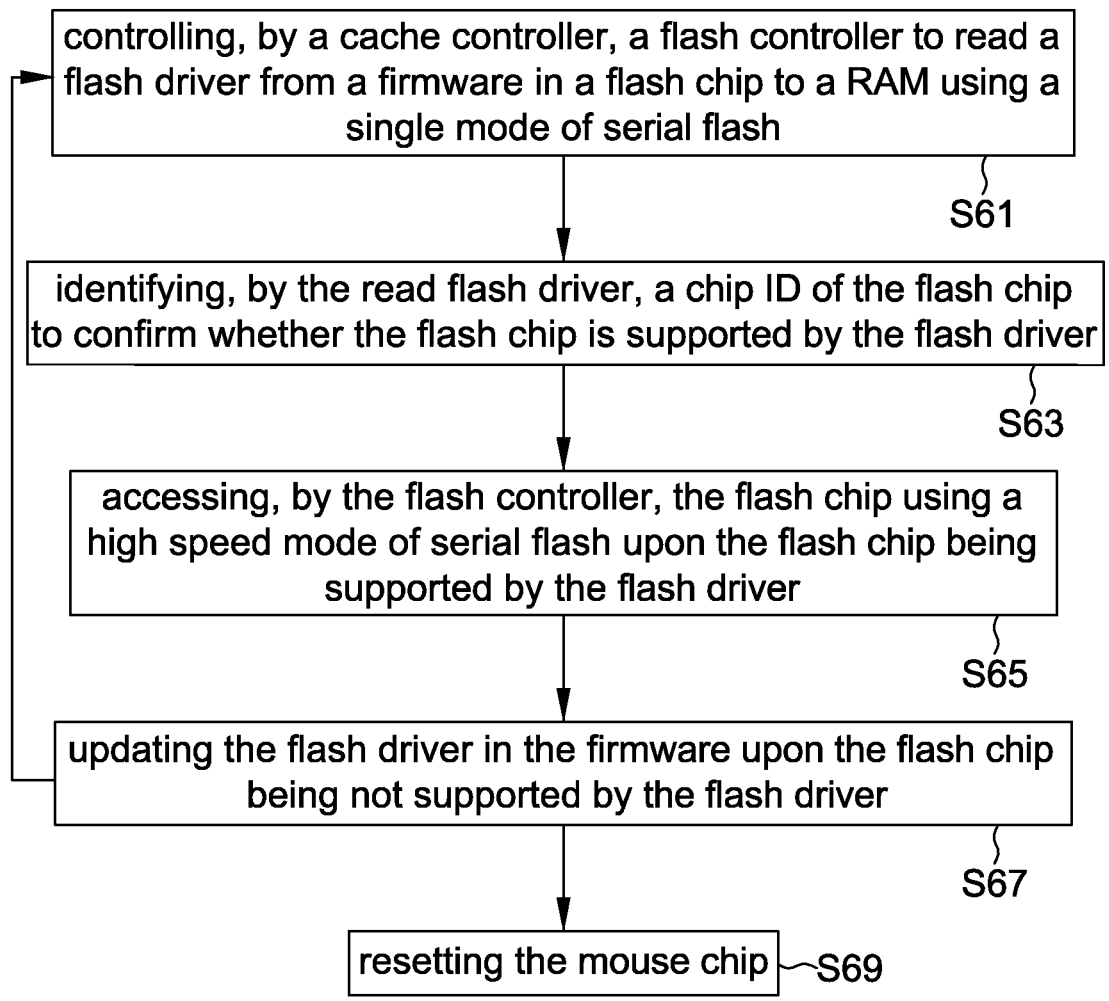
FIG. 6 is a flow chart of an operating method of the mouse chip in FIG. 5 according to an embodiment of the present disclosure.

Please refer to FIG. 6, it is a flow chart of an operating method of the mouse chip 500 in FIG. 5, including the steps of: controlling, by a cache controller, a flash controller to read a flash driver from a firmware in a flash chip to a RAM using a single mode of serial flash (Step S61); identifying, by the read flash driver, a chip ID of the flash chip to confirm whether the flash chip is supported by the flash driver (Step S63); accessing, by the flash controller, the flash chip using a high speed mode of serial flash upon the flash chip being supported by the flash driver (Step S65); updating the flash driver in the firmware upon the flash chip being not supported by the flash driver (Step S67); and resetting the mouse chip (Step S69).

In this embodiment, every time the mouse chip 500 is powered on, the operating method is executed to check a flash driver embedded in firmware 531.

Step S61: Firstly, to run an embedded flash driver, the cache controller 541 controls the flash controller 52 to readout the flash driver recorded in the firmware 531 of the flash chip 53 to a RAM, e.g., independent RAM 55 coupled to the bus system 51 or a cache memory 542, using a single mode of serial flash since the single mode is compatible to flash chips made by different makers.

Step S63: Then, the loaded flash driver in the RAM identifies a chip ID of the flash chip 53 to confirm whether the high speed mode of the flash chip 53 is supported by the flash driver or not. For example, the loaded flash driver in the RAM requires the flash chip 53 (e.g., controlling the flash controller 52 to give a command) to provide the chip ID associated with the flash chip 53 using the single mode.

Step S65: If the loaded flash driver in the RAM confirms the chip ID provided from the flash chip 53 reflecting that the high speed mode is supported by a current flash driver (i.e. the loaded flash driver), the flash controller 52 then accesses (including reading and writing) the flash chip 53 using the high speed mode of serial flash, e.g., including a dual mode and a quad mode.

Step S67: On the contrary, if the loaded flash driver in the RAM confirms the chip ID provided from the flash chip 53 reflecting that the high speed mode is not supported by the current flash driver, the flash driver needs to be updated so as to allow the flash chip 53 to transmit data using the high speed mode. That is, even if the flash chip 53 is embedded with high speed mode, the flash controller 53 can only use the single mode to access data without updating the flash driver.

For example, the mouse chip 500 receives (e.g., required by the processor 56) a new flash driver, which is prepared previously to support the high speed mode of the flash chip 53, from the host 90, e.g. via USB interface. Then, the flash controller 52 controls the flash chip 53 to enter a write mode, as mentioned above by acquiring permission from the FCA 57. Then, the flash controller 52 writes the new flash driver into the firmware 531 in the flash chip 53 to replace the old flash driver.

Step S69: After the flash driver in the firmware 531 is updated, the mouse chip 500 is automatically reset and the operating method re-starts from the Step 61. This time, the operation will proceed to the Step S65 to perform data transmission using the high speed mode supported by the new flash driver.

It is appreciated that if the flash chip 53 is identified to have no high speed mode according to the chip ID, the flash controller 52 continuously accesses the flash chip 53 using the single mode.

Conventionally, the write operation of a flash needs to erase a flash space and then data can be written into the erased flash space. The minimum scale of the flash space to be erased is a sector (e.g., 4 KB), and an erase time of the sector is user awareness. During the operation of a gaming mouse, a user may want to write a user configuration, e.g., including count per inch (CPI) setting, LED (on the mouse device adopting the mouse chip 500) setting, and key setting, into the firmware 531. If the erase operation is aware to the user each time he/she wants to write the user configuration, the erase time will degrade the user experience.

Accordingly, the present disclosure further provides a mouse chip 500 that does not erase any flash sector at each write operation (triggered by the user) in operating a mouse device.

Figure 7:
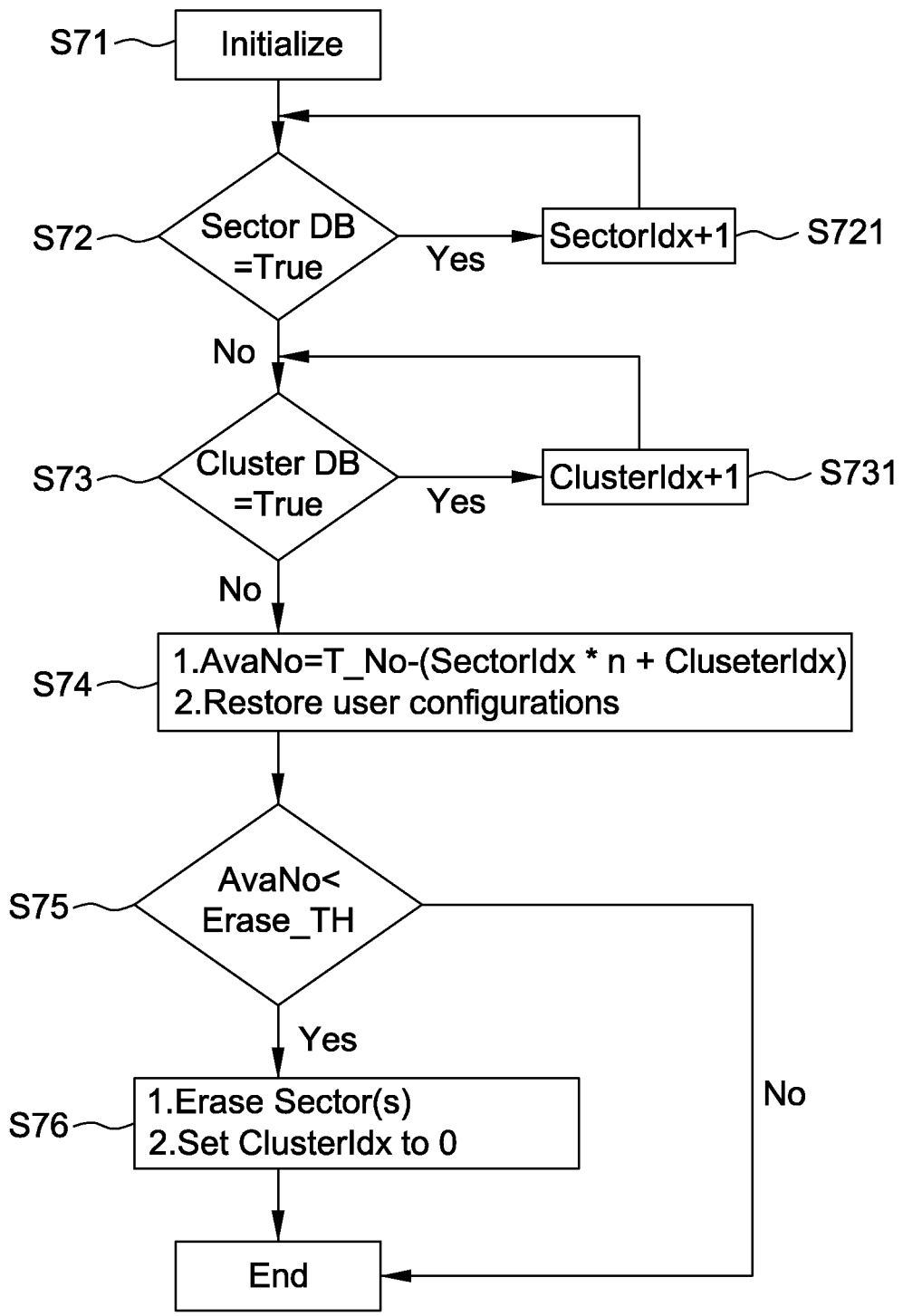
FIG. 7 is a flow chart of an operating method of the mouse chip in FIG. 5 according to another embodiment of the present disclosure.

Please refer to FIG. 7, it is a flow chart of another operating method of the mouse chip 500 in FIG. 5, including the steps of: initializing the operating method (Step S71); calculating a number of available cluster spaces (shown as Avallo) in at least one flash sector and restoring user configurations to a RAM (Step S74); and erasing the at least one flash sector (Step S76) upon the number of available cluster spaces being smaller than an erase threshold (Step S75).

Step S71: Each time the mouse chip 500 is powered on, the operating method in FIG. 7 is performed. In initialization, the flash controller 52 expands a predetermined algorithm embedded in a firmware 531 in the flash chip 53 to the RAM, e.g., an independent RAM 55 or a cache memory 542 without particular limitations.

Step S74: The processor 56 then runs the predetermined algorithm expanded in the RAM to calculate a number of available cluster spaces. In this embodiment, one cluster space is arranged to contain user configurations, which includes at least one of count per inch setting, LED setting and key setting. For example, in operating a gaming mouse, a user would like to set his/her own setting of the gaming mouse to be recorded in the firmware 531. The predetermined algorithm compresses all user configurations already recorded in the firmware 531 in the flash chip 53 into a predetermined size, e.g., 4B, called restored data herein. The restored data is restored in the RAM in the Step S74 such that the recorded user configurations are still effective. It should be mentioned that although FIG. 7 shows that the user configurations are restored in Step S74, it is only intended to illustrate but not to limit the present disclosure. The user configurations are restored after Step S71 and before S76.

Figure 8:
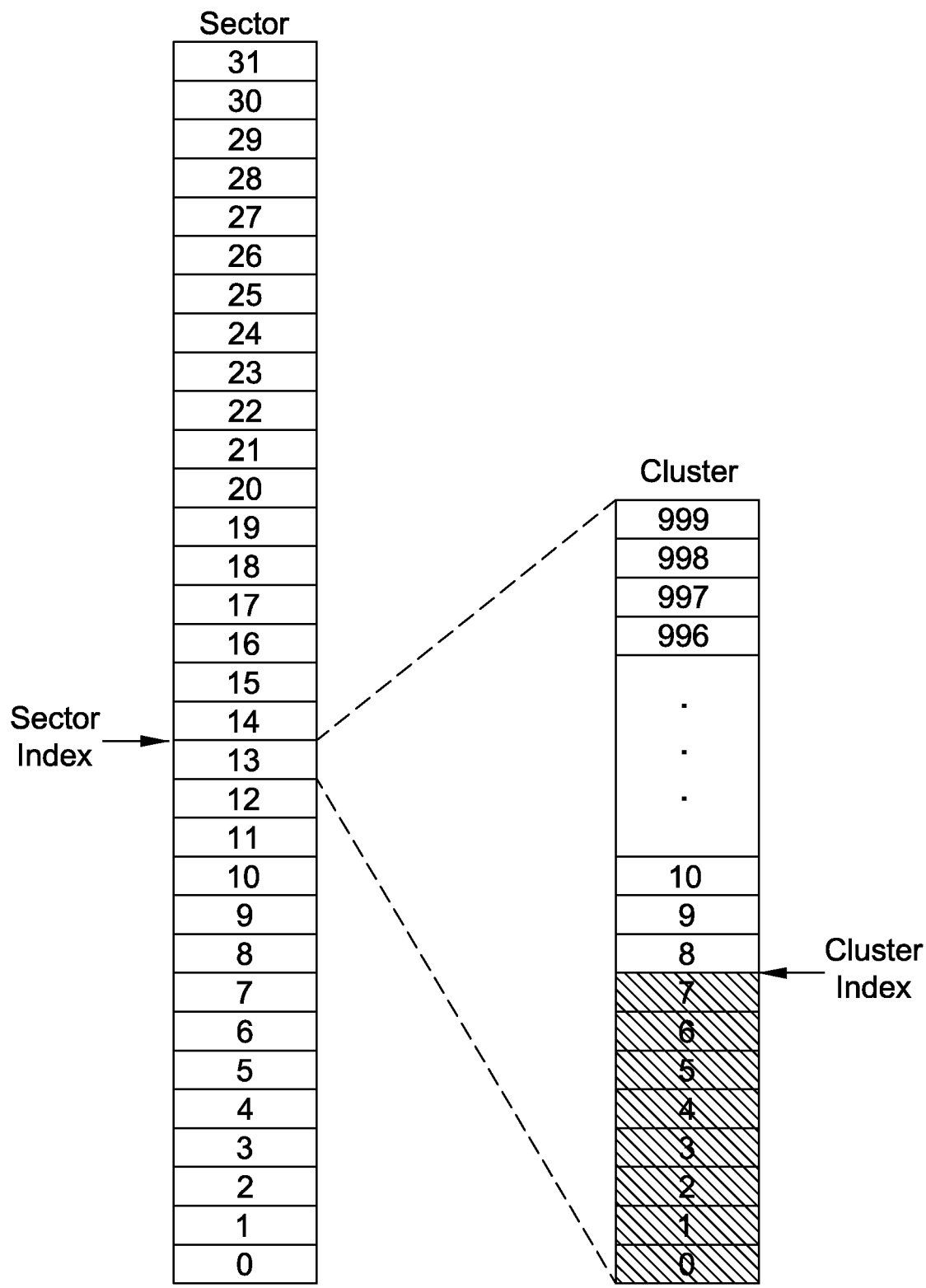
FIG. 8 is a schematic diagram showing the operating method in FIG. 7.

In this embodiment, the at least one flash sector is previously selected exclusive for storing the user configurations. For example, FIG. 8 shows that the flash chip 53 includes 32 sectors, and the at least one flash sector is previously selected as "sector 13", e.g., having 4 KB space. Therefore, the "sector 13" can record 1000 cluster spaces, each having 4B.

To calculate the number of available cluster spaces, the predetermined algorithm checks a sector dirty bit (i.e. indicating sector already recording data) in the Step S72. If the sector dirty bit is true, a sector index is increased by 1 to check a next sector space (e.g., Step S721), e.g., in the case having multiple flash sectors being previously determined for recording the user configurations. However, in the case that only one flash sector is determined for recording the user configurations, and the Steps S72 and S721 are omitted.

Referring to FIG. 8 again, if a sector index is pointed to "sector 13", the predetermined algorithm checks a cluster dirty bit (i.e. indicating cluster already recording data) in the Step S73 in the "sector 13". It is appreciated that data is sequentially recorded from 0 both in sectors and clusters. The predetermined algorithm uses a cluster index to indicate a final cluster dirty bit, e.g., FIG. 8 showing clusters lower than cluster index being used, indicated by filled with slant lines. If one cluster is recognized as a dirty bit (e.g., shown as True in Step S73), the cluster index is increased by 1 to check a next cluster space (Step S731) till the final cluster dirty bit is found. Cluster spaces above the cluster index means available cluster spaces.

Each sector and cluster respectively has at least one bit for indicating whether this sector and cluster is a dirty bit or not.

The number of available cluster spaces is obtained by calculating a difference of a total cluster spaces (e.g., shown as T_No) in the at least one flash sector (e.g., 1000 in FIG. 8 if only one flash sector is selected to record user configurations) and a cluster index, which indicates the cluster dirty bit among the sector dirty bit, e.g., "cluster 7" in FIG. 8. In FIG. 8, the number of available cluster spaces is 1000 (i.e. T_No)—7=993. If the number of available cluster spaces is large enough, the flash sector is not erased so as to eliminate the user awareness in writing the user configurations into the firmware 531.

If the at least one flash sector is more than one, the number of available cluster spaces further counts the used flash sectors, e.g., shows as SectorIdx*n, wherein n is a number of written sectors. Referring to FIG. 8 again, if sectors 12 and 13 are predetermined sectors exclusive for storing user algorithms, and the cluster index is at "cluster 7" among "sector 13", then the number of available cluster spaces is calculated by 2000 (each sector having 1000)–(1000+7) =993. Other sectors in FIG. 8 are for recording different codes or algorithms.

Step S75: Then, the number of available cluster spaces is compared with an erase threshold (shown as Eras_TH).

If the number of available cluster spaces is larger than or equal to the erase threshold (e.g., 200 to 300 cluster spaces, but not limited to), it means that the flash chip 53 still has enough cluster spaces for storing the user configurations after the mouse chip 500 is powered on this time, and the predetermined algorithm does not erase the at least one flash sector.

Step S76: If the number of available cluster spaces is smaller than the erase threshold, it means that the flash chip 53 does not have enough cluster spaces for storing the user configurations after the mouse chip 500 is powered on this time, and thus the predetermined algorithm erases the at least one flash sector, e.g., "sector 13" in FIG. 8, and sets the cluster index to zero. That means, the whole "sector 13" can be used to record user configurations after the mouse chip 500 is powered on this time. New user configuration is directly written into the firmware 531 without entering an erase mode before the write mode.

It should be mentioned that if the at least one flash sector have multiple flash sectors, after the erasing step, all the multiple flash sectors are erased and the cluster index as well as the sector index goes to the lowest flash sector among the multiple flash sectors. The cluster index is started from 0, and the sector index is started from 0 or from a number of the lowest sector space, e.g., 12 provided in the above example.

In the erasing step, the flash controller 53 acquires a control key from the FCA 57. The flash chip 53 enters an erase mode after receiving a permission from the FCA 57 to erase the at least one flash sector. After the at least one flash sector is erased (i.e. erase mode accomplished), the flash controller 53 releases the control key back to the FCA 57.

In this embodiment, because the mouse chip 500 makes sure that the flash chip 53 has enough spaces for storing user configurations before operation begins, the flash chip 53 does not enter an erase mode after the number of available cluster spaces is checked and before the mouse chip 500 is powered off.

The operation of FIG. 6 and FIG. 7 are combinable to be operated the mouse chip 500 of the present disclosure.

As mentioned above, the operation of conventional mouse devices has to be stopped while updating the firmware in a flash thereof, and the mouse device or the system needs to be rebooted after the update. Accordingly, the present disclosure further provides a mouse chip that can maintains the operation of a part of firmware in updating the firmware in the flash thereof (e.g., FIG. 1) and an operating method thereof (e.g. FIG. 4) that is arranged with an additional hardware to actively replay a function return value and change addresses in the registers of the MCU when the firmware in the flash thereof is being updated.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An operating method of a mouse chip arranged in a mouse device, the mouse chip comprising a flash chip, a flash controller, a random access memory (RAM) and a cache controller, the operating method comprising:

controlling, by the cache controller, the flash controller to read a flash driver of the mouse chip from a firmware in the flash chip to the RAM using a single mode of serial flash;

identifying, by the read flash driver of the mouse chip, a chip ID of the flash chip to confirm whether a high speed mode of serial flash of the flash chip is supported by the flash driver of the mouse chip;

accessing, by the flash controller, the flash chip using the high speed mode of serial flash upon confirming that the high speed mode of serial flash of the flash chip is supported by the flash driver of the mouse chip; and updating the flash driver of the mouse chip in the firmware upon confirming that the high speed mode of serial flash of the flash chip is not supported by the flash driver of the mouse chip.

2. The operating method as claimed in claim 1, wherein the high speed mode of serial flash comprises a dual mode and a quad mode.

3. The operating method as claimed in claim 1, wherein the flash chip, the flash controller and the cache controller are coupled to an AMBA bus.

4. The operating method as claimed in claim 3, wherein the RAM is an independent RAM coupled to the AMBA bus or a cache memory.

5. The operating method as claimed in claim 1, further comprising:
   requiring, by the read flash driver of the mouse chip, the flash chip to provide the chip ID associated with the flash chip using the single mode.

6. The operating method as claimed in claim 1, wherein the mouse chip is coupled to a host, and the updating comprises:
   receiving a new flash driver of the mouse chip from the host via a USB interface;
   controlling the flash chip to enter a write state; and
   writing the new flash driver of the mouse chip into the firmware in the flash chip to replace the flash driver of the mouse chip.

7. The operating method as claimed in claim 6, wherein the mouse chip further comprises a flash controller arbiter for permitting the flash chip to enter the write state.

8. The operating method as claimed in claim 1, wherein the operating method is executed each time the mouse chip being powered on.

9. The operating method as claimed in claim 1, wherein after the updating, the operating method further comprises:
   resetting the mouse chip.

10. The operating method as claimed in claim 1, wherein the mouse device is a gaming mouse configured to use the firmware to control lighting of a light emitting diode not for a navigation function.

* * * * *